United States Patent [19]

Fowell

[11] 3,920,043
[45] Nov. 18, 1975

[54] LOW NOISE FAUCET
[75] Inventor: Andrew J. Fowell, Martinsville, N.J.
[73] Assignee: American Standard Inc., New York, N.Y.
[22] Filed: Oct. 9, 1974
[21] Appl. No.: 513,209

[52] U.S. Cl. ........ 137/625.17; 181/33 S; 181/36 R; 251/118; 137/625.4; 138/41
[51] Int. Cl.² .................... F16K 11/00; F16K 19/00
[58] Field of Search ..... 137/625.4, 550, 544, 454.6, 137/625.17, 636.4; 251/127, 118; 181/33 S, 36 R; 138/41, 42, 44

[56] References Cited
UNITED STATES PATENTS

| 151,042 | 5/1874 | McComas | 137/550 X |
|---|---|---|---|
| 1,303,529 | 5/1919 | York | 137/545 X |
| 1,406,943 | 2/1922 | Doulton et al. | 181/33 S |
| 2,513,795 | 7/1950 | Gliss | 137/545 |
| 2,633,343 | 3/1953 | Ashnider | 261/76 |
| 3,347,268 | 10/1967 | Muller et al. | 137/625.17 |
| 3,433,264 | 3/1969 | Parkison | 251/127 X |
| 3,443,693 | 5/1969 | Biermann | 137/550 X |
| 3,533,436 | 10/1970 | Parkison | 137/359 |
| 3,533,444 | 10/1970 | Lyon | 137/625.17 |
| 3,736,959 | 6/1973 | Parkison | 137/454.6 X |

FOREIGN PATENTS OR APPLICATIONS 460,366  11/1950  Italy .................................. 137/545

*Primary Examiner*—Martin P. Schwadron
*Assistant Examiner*—Robert J. Miller
*Attorney, Agent, or Firm*—James J. Salerno, Jr.; Robert G. Crooks

[57] ABSTRACT

An improved water faucet having a valve body with control elements formed by two discs wherein the first disc is stationary and has water inlet openings and an outlet opening, connected on one side to the valve manifold. The other side is directed toward the second disc, which is movably arranged on the first disc. The second disc has a surface cavity of the second disc and being spaced from the ceiling thereof to form a chamber which aids in reducing the cavitation noise of the valve.

6 Claims, 7 Drawing Figures

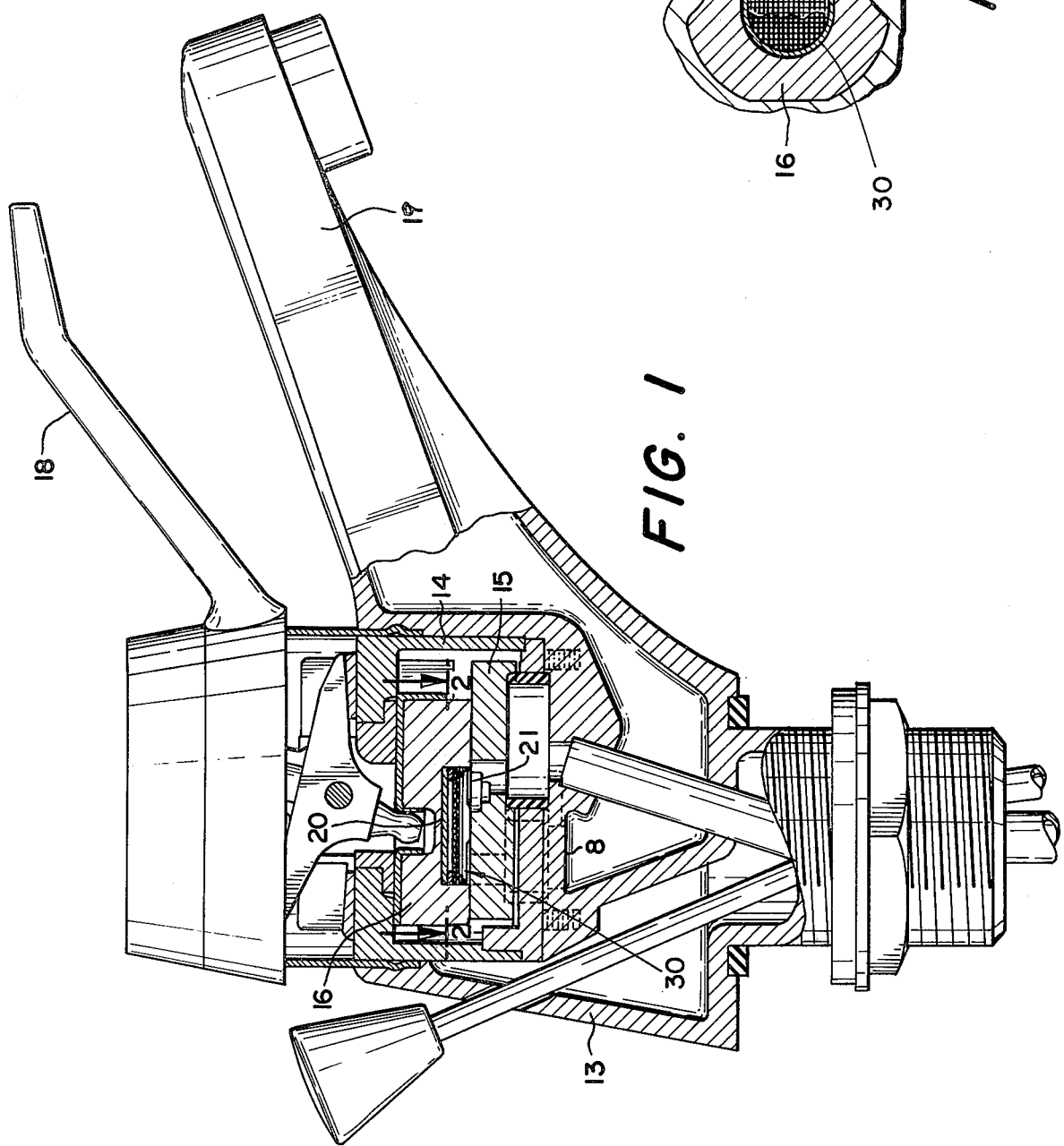

LOW NOISE FAUCET

CROSS REFERENCE TO RELATED INVENTIONS

The mixing faucet and valve in accordance with the present invention represents improvements of the faucet and valve disclosed in U.S. Pat. Nos. 3,433,264 and 3,533,436.

BACKGROUND OF THE INVENTION

In recent years, mixing faucets have to a large extent replaced the separate hot and cold water faucets which are used on sinks, lavatories, bathtubs and showers. In mixing faucets, hot and cold water have been mixed to the desired ratio and delivered to the sink lavatory from a single spout at the desired temperature with the desired rate of flow. These faucets are usually provided with a single handle or lever which can be used to control both the desired rate of flow and the desired temperature of water. In using mixing valves, the control handle is designed so that the for-and-aft direction controls the rate of flow, and the side-to-side motion of the handle controls the temperature of the water. In traditional types of faucets, the lever is arranged so that a movement to the left causes hot water to flow while a movement to the right causes cold water to flow.

Mixing faucets are generally designed to incorporate a mixing valve and may be in the form of a cartridge so that it may be removably attached to the manifold of the faucet housing within the decorative structure. Valve cartridges of this type include inlet openings for the entry of hot and cold water from the housing of the faucet, and an outlet opening through which the desired mixture of water may be returned from the valve cartridge to the faucet for discharge through a spout into the sink, lavatory, bathtub or shower. A stationary valve-seat disc is provided within the cartridge and includes ports corresponding to the openings in the housing. A movable valve-plate disc is also provided and arranged for slidable sealing contact with the valve seat disc. The valve plate disc includes either a cavity in its surface adjacent to the valve seat disc, or ports therethrough which can be disposed to cooperate with corresponding ports in the valve seat disc to admit water from the hot and cold water lines for mixing purposes.

The movable valve-plate disc is couples to the control lever of the mixing faucet. The valve-seat and plate discs are preferably constructed of a very hard ceramic material such as aluminum oxide, and their mating surfaces are polished extremely smooth and flat. These materials do not deteriorate appreciably with time, and are so hard that very little wear takes place even between their cooperating surfaces.

One of the problems of mixing faucets of this type has been their noisiness of operation due to cavitation occuring within the valve seat and plate disc. In order to reduce the noise problem, the cavity formed within the valve plate disc was provided with a series of ridges or terraces which were designed to break up, divide, and distribute the cavitation bubbles which are formed.

Although, these design improvements of the prior art managed to reduce noise level caused by cavitation the noise level still is objectionable under certain plumbing codes. The cavitation noise produced within the valve plate disc and transmitted through the valve body and the feed pipes of the faucet was still to be found objectionable. In another embodiment of the prior art, a single screen was added across the ceiling of the cavity of the valve plate disc to further break up the cavitation bubbles responsible for the noise during the operation of the faucet. Difficulties were encountered for permanently mounting the screen within the cavity of the ceramic disc. Any dislodgment of the screen could damage the valve components and would affect the performance of the faucet particularly with regard to the reduction of noise provided by the screen. However, although the resultant noise was reduced it was still found to be objectionable under certain plumbing-code standards.

SUMMARY OF THE INVENTION

Accordingly, it is an object of the present invention to provide a faucet which is capable of reducing the noise level below that of faucets of the prior art during operation.

It is another object of the present invention to provide a faucet having improved mounting means for affixing the noise reducing means within the valve body.

It is a further object of the present invention to provide a faucet which is capable of quiet operation to meet a large number of plumbing code standards.

Still another object of the present invention is to provide a low-noise faucet having one or more screens positioned a predetermined distance from the ceiling of the cavity of the movable disc.

It is a further object of the invention to provide mounting means within the cavity of the movable disc of a faucet for accurately positioning and retaining the noise reducing means therein so that said means will not be dislodged therefrom.

It is a further object according to the present invention to provide an improved water faucet which is quieter and reliable in operation, simple in design and easy to construct and to manufacture.

Briefly, the objects of the invention are fulfilled by providing a water faucet having a mixing valve with control elements formed by two discs. The first disc is fixed or stationary and is provided with inlet openings which are connected to one side to the water pipe of the valve manifold. The other side is directed towards a second disc which is arranged to be movable on the surface of the first disc. The second disc has a surface cavity which can simultaneously overlap the inlet openings and an outlet opening formed in the first disc to permit any desired water mix ratio of hot and cold water.

In the invention, a noise-isolating means is positioned in the cavity of the second or movable disc, and preferably includes one or more screens which are held in place by one or more retaining rings at a predetermined spacing from the ceiling of the cavity.

The introduction of one or more wire screens into the cavity of the second or movable disc provides a perforated surface to break up the cavitation bubbles and a surface on which the bubbles may implode. The wire screen also reduces noise that may be transmitted to the discs of the cartridge. In some instances, the space formed between the screen and the ceiling of the cavity may fill with air to provide an additional cushion against noise being transmitted to the disc.

Other objects and features of the present invention will become apparent from the following detailed description considered in connection with the accompanying drawings which disclose the embodiments of the invention. It is to be understood, however, that the drawing is designed for the purpose of illustration only and not as a definition of the limits of the invention as

BRIEF DESCRIPTION OF THE DRAWINGS

In the drawings wherein similar reference characters denote similar elements throughout the several views:

FIG. 1 illustrates a water faucet in the form of a mixing valve partly in longitudinal section including noise reducing means disposed in the movable disc;

FIG. 2 is a cross-sectional view taken along section 2—2 of FIG. 1 in which the noise reducing means is shown broken away to illustrate the component parts;

DESCRIPTION OF PREFERRED EMBODIMENTS

Figure 3:
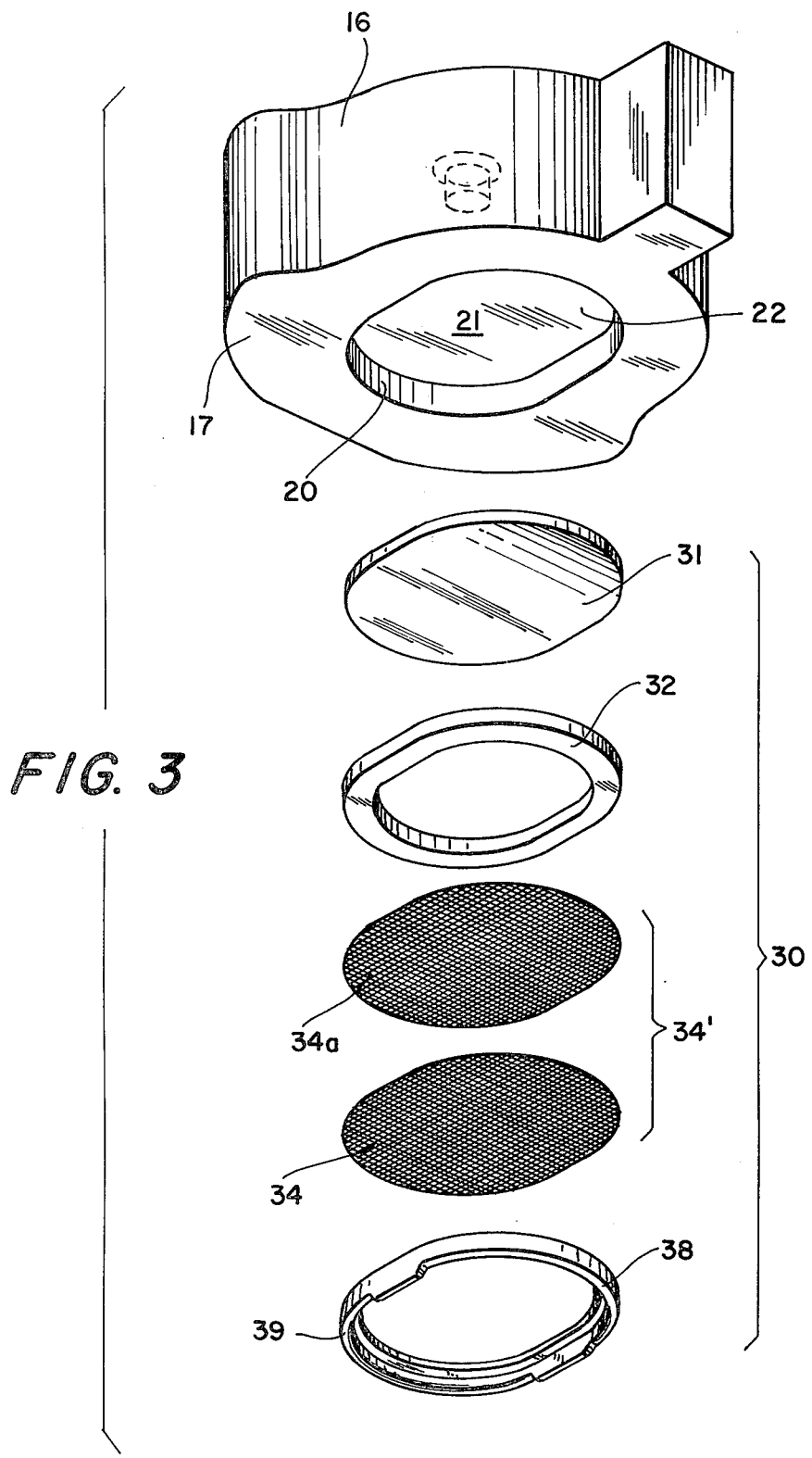
FIG. 3 is an exploded view of the movable disc and the noise reducing means as it would be assembled within the cavity of the disc.

FIG. 1 is a side view partly in cross-section of a water faucet similar to that disclosed in U.S. Pat. Nos. 3,433,364 and 3,533,436. The faucet body 13 which mounts and houses the mixing valve 14 in the form of a casing or cartridge includes control elements formed by two disc 15 and 16. Discs 15 and 16 may be made of any suitable materials which can be formed having smooth relatively hard surfaces such as ceramic, molded plastic, metals or the like. Disc 15 is mounted in fixed position in cartridge 14 and has two inlet openings for hot and cold water as well as an outlet opening 8 shown in broken line leading to outlet 19 for discharging the mixed water. Disc 16 is movable on disc 15 so that it can slide or swivel by lever control means 18. Disc 16 is formed having a surface cavity 21 and is in fluid communication with the inlet openings and the indicated outlet opening of lower disc 15. Noise reducing assembly 30 is shown mounted in cavity 21 so that when water is conducted through the inlet openings the noise level of the water is substantially reduced as it passes through cavity 21 through outlet opening 8.

Figure 7:
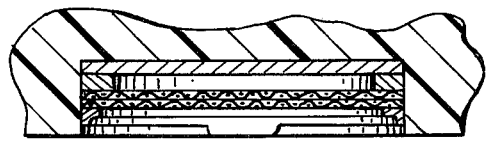
FIG. 7 is a sectional elevational view of FIG. 3 fully assembled.

In FIG. 3 there is illustrated in an exploded view disc 16 and noise reducing assembly 30. Noise reducing assembly 30 includes a spacer disc 31 which is secured against ceiling 22 of cavity 21 by spacer ring 32. Spacer disc 31 is preferably made of plastic and serves to prevent the transmission of noise as water enters cavity 21 of movable disc 16. Spacer ring 32 maintains the required spacing for noise reducing means 34 from spacer disc 31 to optimize the reduction of noise by water being conducted through cavity 21. Retaining ring 38 is mounted within cavity 21 and holds noise reducing means 30 in fixed position within cavity 21. Noise reducing means 30 includes screens 34a and 34b and are positioned between spacer ring 32 and retainer ring 38 as shown in FIG. 7. Screens 34a and 34b are preferably formed as a pair of fine mesh steel wire screens which are noncorrosive to water. Retaining ring 38 is sized to fit between the walls 20 defining cavity 21 and the outer surfaces of retaining ring 38.

Retaining ring 38 has its inner edges 39 rounded in a smooth surface to avoid a sharp corner which would cause increased cavitation noises to be produced as water passes by ring 38 into cavity 31.

As shown in FIG. 7 retaining ring 38 is recessed within cavity 21 to provide a smoother mating surface 17 of movable disc 16 so that movable disc 16 slides across the corresponding surface of stationary disc 15. Also, since retaining ring 38 is recessed in cavity 21 it will not interfere with the porting action of stationary or fixed disc 15.

Figure 5:
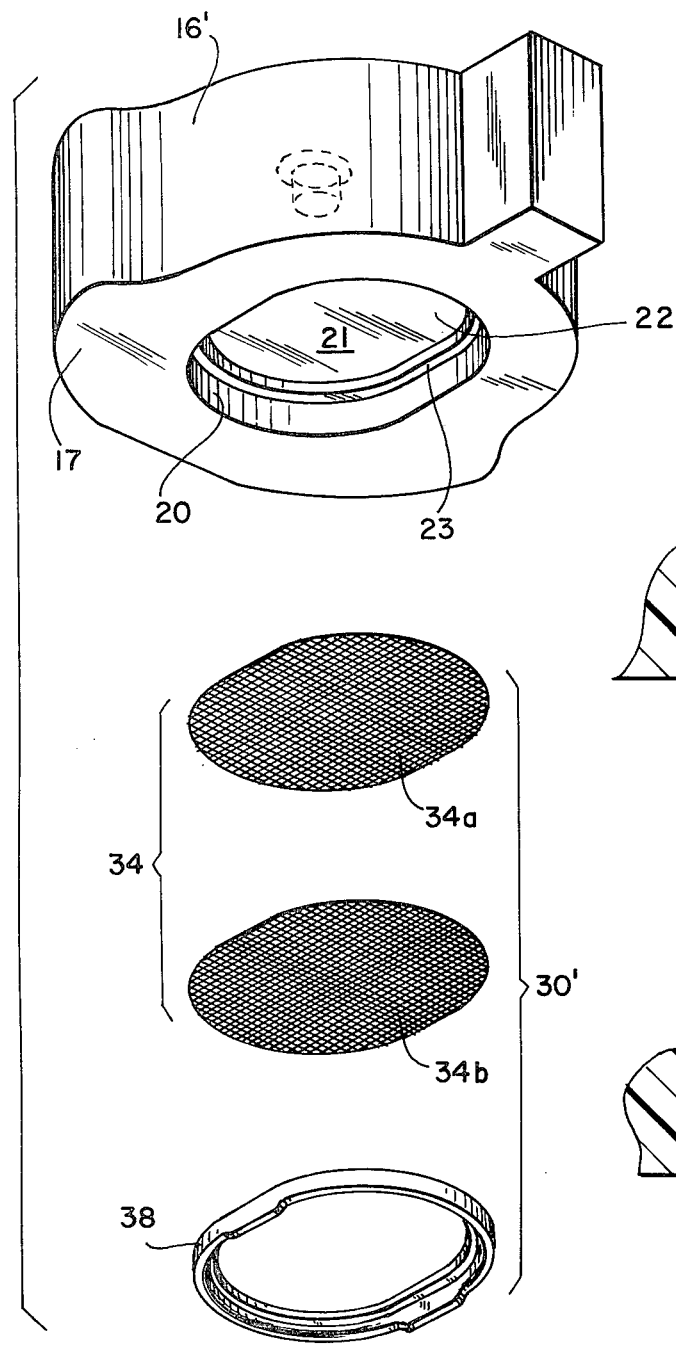
FIG. 5 is a view similar to FIG. 3 illustrating another embodiment of a noise reducing means as it would be mounted and accurately positioned within the cavity of the movable disc.
Figure 6:
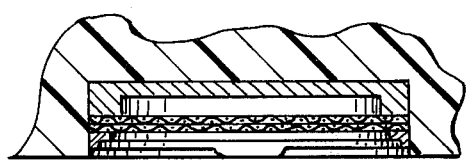
FIG. 6 is a sectional elevational view of FIG. 5 fully assembled.

FIG. 5 is a view similar to FIG. 3 and illustrates in exploded view movable disc 16' and a modified form of noise reducting assembly 30'. Noise reducing assembly 30' includes a noise reducing means 34 which includes a pair of screens 34a and 34b. Retaining ring 38 is of similar construction as shown in FIG. 3 as are screens 34a and 34b. Movable disc 16' is formed having a cavity 21 defined by walls 20. A step 23 of predetermined height is formed at the juncture of ceiling 22 of cavity 21 and walls 20 to provide the required spacing for noise reducing means 34 from ceiling 22 to optimize the reduction of noise by water being conducted through cavity 21. Since retaining ring 38 is sized to fit against wall 20 of cavity 21, noise reducing means 34 are held in fixed position on step 23 as shown in FIG. 6.

Noise reducing means 34, as illustrated in FIGS. 3 and 5, are preferably constructed of stainless steel wire having a diameter of 0.005 inch and formed in a 0.03 inch mesh. Retaining ring 38 has a height such that noise reducing means 34 are spaced from ceramic disc 15 by about 0.09 inch which permits sufficient flow of water through the faucet of the type illustrated in FIG. 1. Where a water faucet, such as shown in FIG. 1, has a movable disc 16 of a thickness of about one-half inch, a cavity 21 of about 0.23 inch in depth, a length of about eleven-sixteenths inch and a width of about one-half inch and noise reducing screens 34a and 34b spaced from the ceiling 22 of about 0.086 inch provides optimum noise reduction for such a faucet. Obviously where a water faucet having definite dimensions for the movable disc and particularly the cavity formed therein the space of noise reducing means 34 from the ceiling of the cavity would also change.

Figure 4:
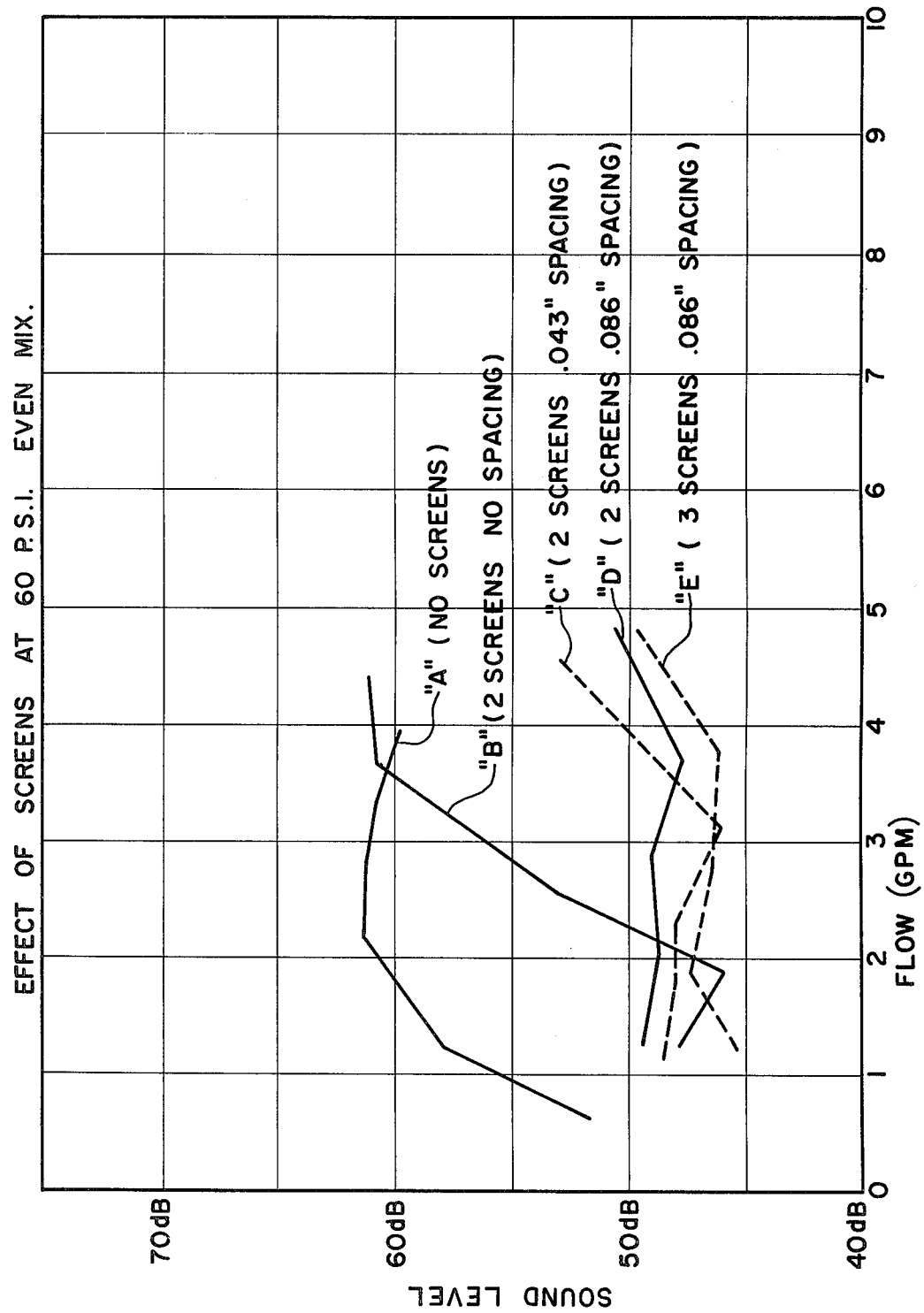
FIG. 4 is a comparative plot of noise in dB against flow rate for a water faucet having up to three noise-reducing screens.

FIG. 4 is a comparative plot of the noise level of a water faucet with respect to the flow rate of the faucet taken at 60 p.s.i. water pressure when the valve is set at the center mix position. The two plots A and B having the highest noise levels were measured for a standard water faucet without screens, and for a water faucet having two screens mounted against the ceiling of the cavity. When two screens were provided at a spacing of 0.043 inch from the ceiling of the cavity, the broken-line plot C was measured. The measured noise stayed under 50 dB for low flow rates, but exceeded the noise level at the high flow rates. The best obtainable results for two screens occurred with a cavity spacing of 0.086 inch as shown in plot D, so that throughout most of the flow, the noise level of the valve remained below 50 dB. The axes of the two screens were in alignment with each other when the measurements were made.

A further broken-line plot E shows the results of three screens, wherein a third screen was added to screens 34a and 34b the uppermost was spaced 0.086 inch from the ceiling of the cavity. This plot shows a slightly improved noise reduction over the plot for the two screens of the same spacing within the cavity. The axes of the three screens were in alignment with each other when the measurements were made.

The use of three screens, however requires the movable disc to have an additional thickness, which in some instances, is undesirable since the increased thickness of the movable disc requires a redesign of the water faucet. For most applications, the use of two screens together with their spacing rings and retaining rings were found to be acceptable in reducing noise to meet most plumbing standards for different flow rates of the valve.

While only a few embodiments of the present invention have been shown and described, it will be obvious to those skilled in the art that many changes and modifications may be made thereto without departing from the spirit and scope of the invention.

What is claimed is:

1. In a water faucet having a valve body with control elements formed by two disc, the first disc being stationary and having water inlet openings and water outlet opening connected on one side to a valve manifold and on the other side directed towards the second disc which is movably arranged on the first disc, the second disc having a surface cavity arranged and constructed to overlap the inlet openings and the outlet opening formed in the first disc, that improvement consisting essentially of:

noise reducing means disposed within said surface cavity of the second disc, formed of at least one screen mounted therein at a predetermined distance from the ceiling of said cavity thereby defining a noise-isolating chamber within the cavity.

2. The water faucet according to claim 1 wherein said noise-reducing means includes a pair of metal screens coupled together and positioned within said cavity to provide a perforated surface for cavitation bubbles to implode thereon.

3. The water faucet according to claim 2 additionally comprising a spacer disc mounted against the ceiling of the cavity to provide further means for the reduction of noise caused by the cavitation bubbles entering said noise isolating chamber.

4. The water faucet as recited in claim 3 additionally comprising at least one spacer ring positioned between the screens and the spacer disc to define said noise isolating chamber and a retaining ring for securing the screens within the cavity in fixed position.

5. The water faucet as recited in claim 1 wherein the cavity formed in said movable disc includes an integrally formed step of predetermined height for positioning said noise reducing means a predetermined distance from said ceiling.

6. The water faucet as recited in claim 5 wherein said noise reducing means includes a pair of screens positioned on said step and a retaining ring mounted within said cavity to fix said screens in position on said step.

* * * * *